May 31, 1949.　　　　T. A. HUTSELL　　　　2,471,751
COLLAPSIBLE GOLF-BAG CART
Filed April 15, 1947　　　　　　　　　　　3 Sheets-Sheet 1
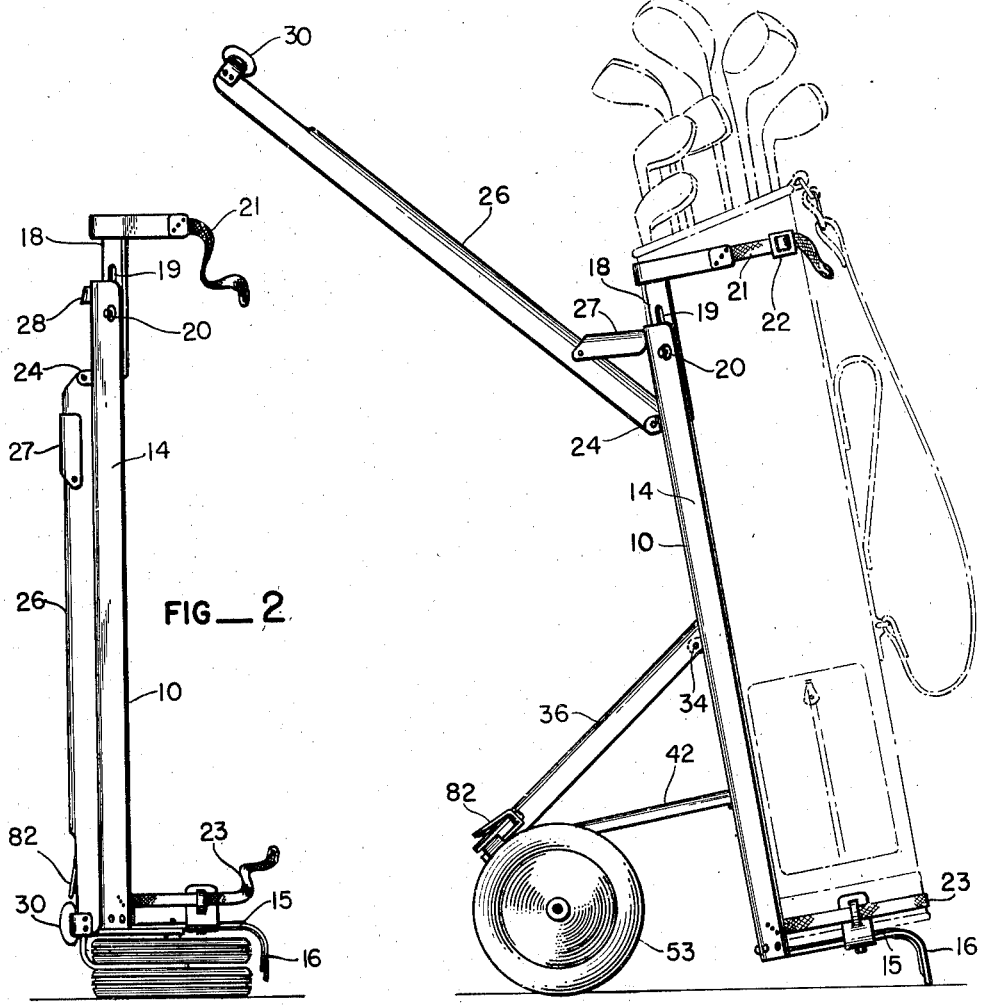
FIG—2
FIG—1
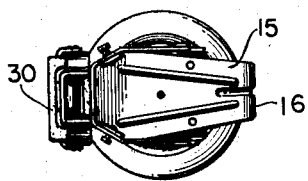
FIG—3
THOMAS A. HUTSELL
*INVENTOR.*
BY Smith & Tuck
ATTORNEYS

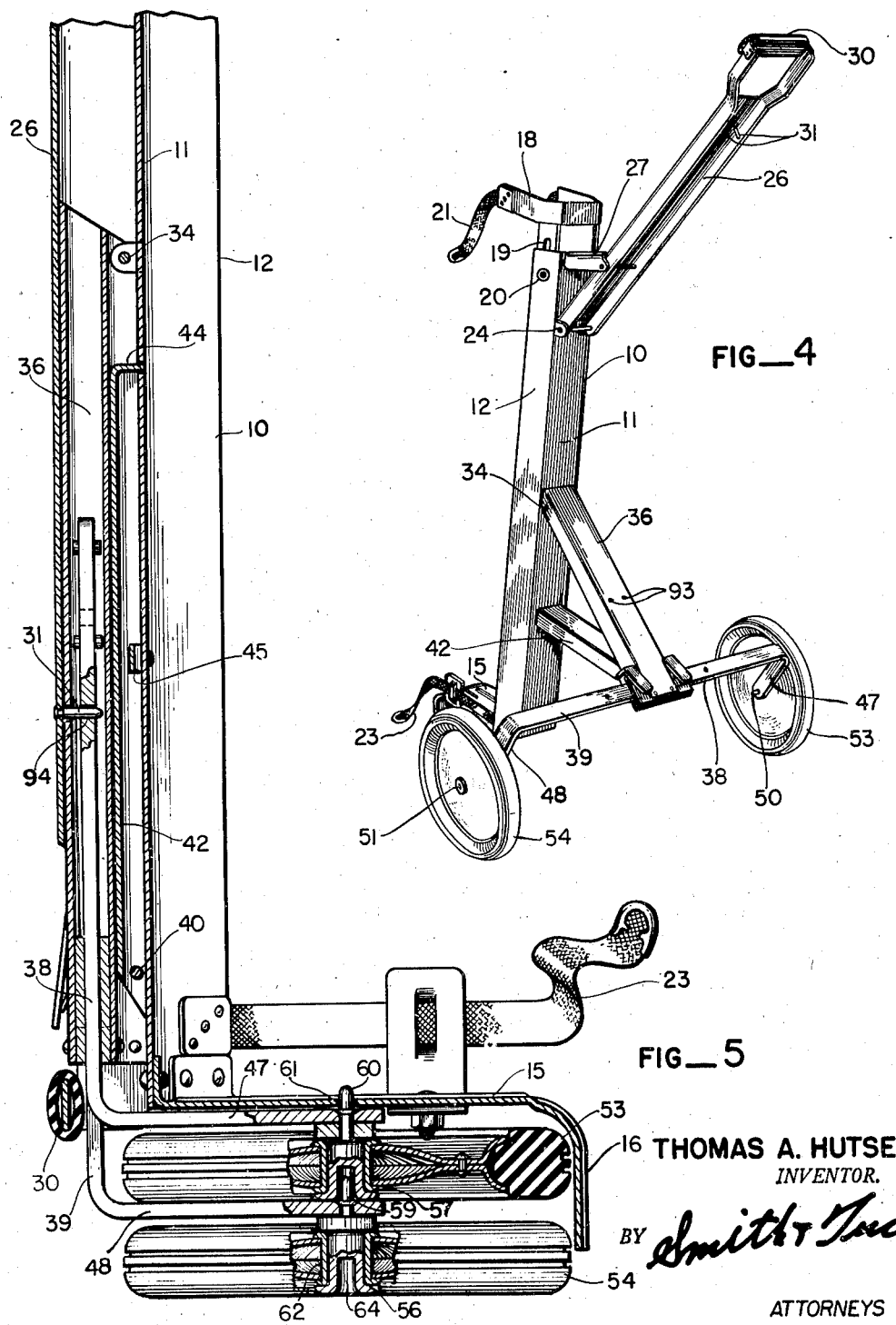

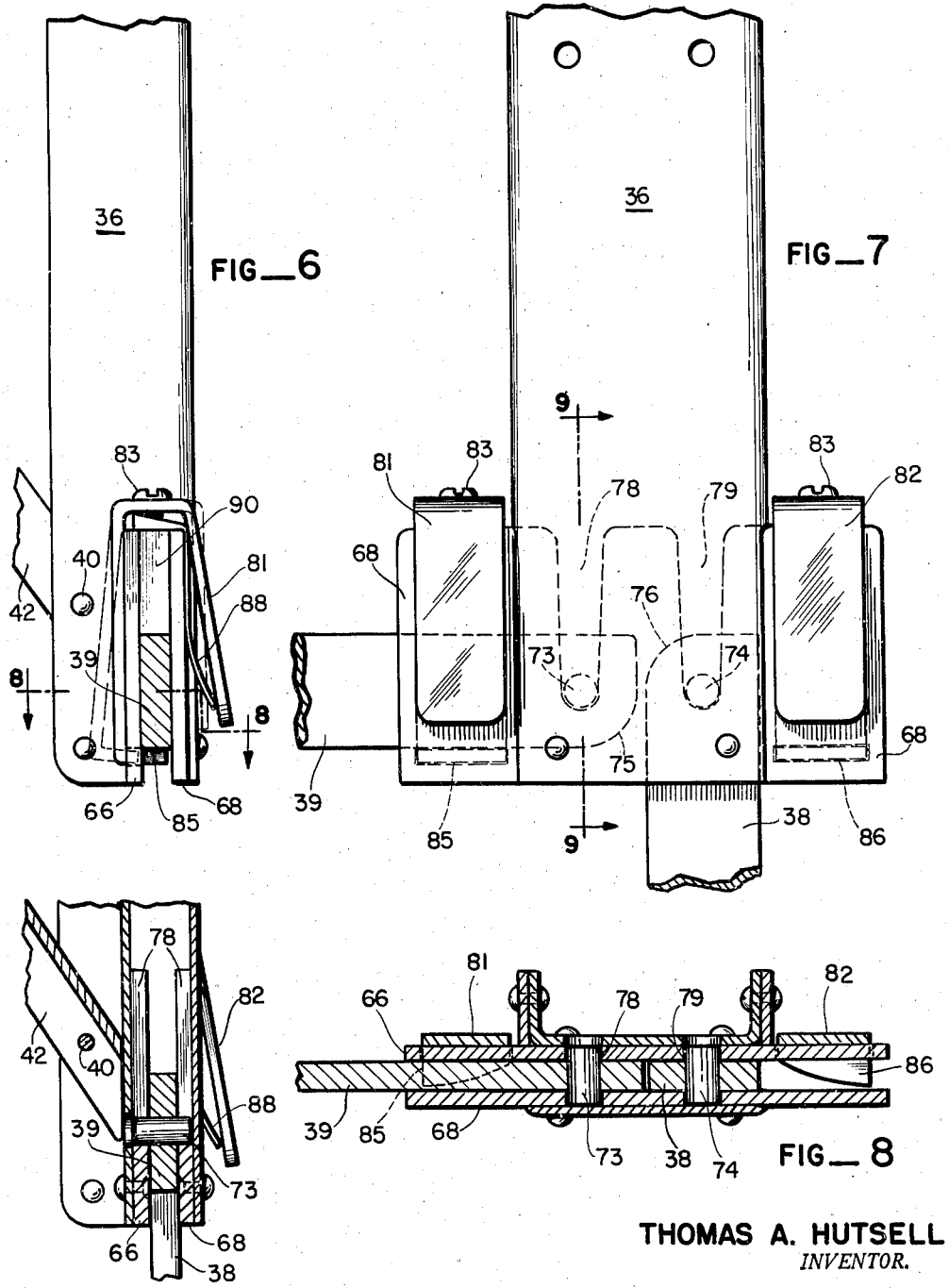

Patented May 31, 1949

2,471,751

UNITED STATES PATENT OFFICE 2,471,751

COLLAPSIBLE GOLF BAG CART

Thomas A. Hutsell, Renton, Wash.

Application April 15, 1947, Serial No. 741,475

9 Claims. (Cl. 280—38)

My present invention relates to the general art of golfing accessories and, more particularly, to a collapsible golf-bag cart.

The change in economic conditions in this country has reduced the usual supply of caddies to a very low minimum and this condition, in turn, has awakened interest in a cart which will enable a player to conveniently wheel about the golf course his own heavy bag of clubs. Many attempts have been made to provide a wheeled arrangement for the transportation of a golf bag, and many have been produced which are particularly easy to use and have awakened the general public to the desirability of such a transporting device. However, in the various bag carts that have been observed none seem to fully take into account the need of such a device. There is need for more than just a device that will conveniently permit the transportation of a golf bag. Any golf-bag cart is used but a relatively small fraction of the time and during the rest of the time it must be either transported by its owner in his car or it must be stored in a locker at his favorite golf club.

A careful survey of the known golf carts discloses that, in order to achieve the folding-in of the necessary wheels and the folding of the handle and the like, most of the carts produced are bulky, which very materially increases the overall dimensions of the golf bag to such an extent that its transportation in a car is difficult and it will not go into the standard lockers that have for years been provided at golf clubs. It is to overcome these deficiencies as noted that I have produced my foldable golf bag cart.

My present cart is so arranged that it can be folded in such a manner that the wheels themselves are substantially co-axial with the bag, and add but very little to the length of the same. I have further provided that the cart itself is made largely of shaped metal plate, preferably aluminum or its various alloys, so that very little additional size is added to the cross section of a golf bag. Therefore, it can be placed in the usual golf-bag locker or can be stowed in an automobile with practically the same ease as a golf bag without a cart attachment.

The principal object of my invention, therefore, is to provide a golf bag cart which is folded in such a manner that it adds little to the length or girth of a standard golf bag.

A further object of my invention is the provision of a golf bag cart which is fabricated of flat sheet metal plate so broken or bent as to partially encircle the bag and thus tend to fit into the general contour of the same.

A further object of my present invention is to provide a golf bag cart in which the wheels are arranged so that they lie substantially coaxial with the bag when folded and take up as additional space substantially only the thickness of the rubber tires on the wheels.

A further object of my invention is to use structural shapes as distinct from tubing, to the end that the various essential parts can be made cheaply of easily obtainable materials and because of their shape can be made of relatively light sections.

A further object of my present invention is to provide a golf bag cart in which the various elements are locked in the transporting position and are easily unlocked and put into the position of use, at which time they automatically become locked again in their position of use.

A further object of my present invention is to provide a golf bag cart which is easily opened for use or closed for transportation, and in either case, provides a well balanced carrying package.

Further objects, advantages and capabilities will be apparent from the description and disclosure in the drawings or may be comprehended or are inherent in the device.

In the drawings:

Fig. 1 is a side elevational view of a golf bag cart made after the teachings of my present invention, the same showing a golf bag and set of clubs in dashed lines to illustrate the relationship between the cart and the bag.

Fig. 2 is a vertical elevational view, showing my cart in its collapsed position but with the golf bag removed therefrom.

Fig. 3 is a top plan view of my golf bag when the same is folded, and with the bag securing straps removed to clarify the view.

Fig. 4 is a perspective view showing my golf bag cart in position for use excepting that the golf bag itself has not been put in place.

Fig. 5 is an enlarged vertical sectional view such as would be observed by taking a vertical sectional view through a lower portion of Fig. 2.

Fig. 6 is an enlarged detail view showing the lower portion of the bracket bar and the means employed for locking the wheel outriggers in position.

Fig. 7 is a view on the same general scale as Fig. 6 but showing a face view of the bracket bar and the outrigger locking means.

Fig. 8 is a cross sectional view, as though taken along the lines 8—8 of Fig. 6.

Fig. 9 is a cross sectional view taken along lines 9—9 of Fig. 7.

Referring more particularly to the disclosure in the drawings, the numeral 10 designates the main frame of my cart. This I prefer to form with a broad principal portion 11 and angularly disposed side members 12 and 14. This frame, which is the main member of my cart, has secured to it at its lower end the bag supporting bracket 15. The bracket has a downwardly extending lip portion 16 which serves as a rest for the bag when in use, as will probably best be observed from a study of Fig. 1. At its upper end, frame 10 has slidably secured to it the top bracket or securing member 18. This member is slotted as at 19, and may be locked in vertical adjusted position by a plurality of screws 20. At its upper end, member 18 is provided with a strap and strap securing means 21 and 22, respectively, so that it can engage the upper margin of a golf bag after the showing of Fig. 1.

Co-acting with strap 21 are lower straps 23 which are secured at one end to the main frame and are slidably positioned through slotted brackets secured to base bracket 15. Thus it can be seen that when the upper and lower straps are fully secured around the golf bag, it is held firmly in position, so that the bag can be handled by grasping the cart or, conversely, the cart, in its fixedly folded position, is easily handled by grasping the bag.

Pivotably secured to the main portion of frame 10, as at 24, is the handle 26. This handle is secured in fixed operating relationship with the main frame by a handle strap 27, which is pivoted to the handle and engages, by means of a downturned end, the main frame, through the means of a spaced-apart bracket 28. The handle itself is bifurcated at its outer end and the two like members are spread so as to accommodate a covered handle 30. On the under side of handle 26 are two spaced-apart detents 31, which serve a locking purpose that will be more apparent later.

Pivotably secured to the main portion of frame 10 at 34 is the collapsible bracket bar 36. This bar forms a housing for the wheel outriggers 38 and 39 when the cart is in its collapsed position, and serves as a means for transferring the load from the bag to the wheels and their associated outrigger arms when the cart is in use.

Pivotably secured to the outer end of bar 36, as at 40, is the bracket strut 42. In the using position of the cart, a downturned end of the bracket strut, as 44, is engaged in the outstanding bracket 45 secured to the main frame. This provides a triangular arrangement involving the main frame, the bracket bar and the bracket strut, so that great rigidity is obtained.

At their outer ends the outrigger arms 38 and 39 are provided with downturned portions 47 and 48, which in turn carry the wheel axles 50 and 51. To these wheel axles are secured the load carrying wheels 53 and 54.

Referring more particularly to Fig. 5, it will be observed that each of the wheels is provided with a centrally disposed journal member as 56 or 57 and, in turn, each of these have at one side of the journal a stud, as 59 and 60, which serves, by means of a swedged-on collar 61, to secure the journals fixedly to the outrigger legs. The outer ends of journals 56 and 57 are flanged over the wheel-bearing members 62, so as to hold the wheels fixedly in position, but permitting their easy revolution upon the journals. Each of the journals is further provided with an axially disposed recess, or bore, 64, which, as will be observed in Fig. 5, is employed to insure accurate alignment of the wheels when the cart is in its folded position. It is desirable that both of these wheel assemblies be similar in construction, so that either one might be placed uppermost in the folded position.

The manner in which the outrigger arms are folded and locked in their folded positions will probably be best understood from a study of Figs. 6, 7, 8, and 9. Supported from bracket bar 36, in spaced apart relationship, are the two outrigger side support and guide members 66 and 68, which are of considerable lateral extent and are spaced apart sufficiently so as to slidably receive the outrigger arms 38 and 39. Each of these outrigger arms is provided with a detent as 73 and 74, which extend outwardly from each surface of the outriggers so as to engage guide bars 66 and 68 for the full thickness of the members. This construction is probably best illustrated in Figs. 8 and 9. In Fig. 7 it will be noted that the outriggers have one of their corners rounded, as at 75 and 76, so that they may be individually revolved about their respective detents 73 or 74 without interfering with each other. This is essential, in order to have a compact arrangement with the two outriggers in the same plane without interference which would otherwise occur.

It is to be noted in Fig. 7 that guide plates 66 and 68 have vertical slots for the engagement of detents 73 and 74. These are illustrated at 78 and 79 and are preferably tapered substantially as illustrated, so that the detents are free to pass upwardly out of the slot and can easily center themselves when they are again brought down to reengage the slots during the folding operation and while in the folded position.

Disposed upon the lateral extension of side plates 66 and 68 are two companion U-shaped locking members 81 and 82. These members are held in position by screws 83, but are pivotably held so that they can normally assume the position shown in Fig. 6, in which the actual locking cams as 85 and 86 are underneath the outrigger arms and lock them in the outwardly extended position. They are held in this position normally by springs 88. It will be apparent, it is believed, however, that if member 81 is moved to the left, as viewed in Fig. 6, to the dotted line position shown, the locking cam members 85 and 86 will be withdrawn from engagement with the outriggers to permit the same to be folded into the carrying position. In the extended position, the outrigger arms 38 and 39 are blocked with filler blocks 90, one of which is disposed on each side of frame 10 immediately under the U-shaped cam members 81 and 82.

Method of operation

Assuming the bag cart to be in its folded position, as shown for instance in Fig. 2, the first operation required to put it into service is to grasp handle 30 and swing it upwardly to the general position shown in Fig. 1 and to then secure it in that position by means of the handle strut 27. This movement of the handle has withdrawn detents 31 which normally pass through holes 93 in bar 36 and engage into openings in the outrigger arms, as shown in Fig. 5 at 94. This releases the outriggers so that the outriggers and the wheels that they support can be pulled outwardly until detents 73 and 74 again engage slots 78 and 79 and reach the bottom thereof after the showing of Fig. 7. At this time, the outriggers can be swung upon the detent pivots 73 and 74 to their extended outward positions and during this operation they will cam out of their way the locking cams 75 and 76 due to the curved faces of these cams, which is illustrated in Fig. 8. Springs 88 assure the positioning of these cams as soon as the outrigger arms are in their fully extended outward position. At this time the collapsible bracket bar 36 can be swung about pivot 34 until it assumes its final position substantially as shown in Fig. 1 and Fig. 4, at which time the bracket strut 42 is snapped into bracket 45 and the device is ready for use.

To close the deivce for transporting it after use, a reversal of this operation is followed, except that at this time it is necessary to manually compress springs 88 in order that the outriggers may be pivoted on detents 73 and 74 and again be brought to a position with their axis aligned with bracket 36. It is then only necessary to swing the wheels into position so that stud 60 aligns the two wheels and then in turn engages in the bracket opening in bracket 15 so as to assure coaxial alignment of the wheels. After the bracket strut 42 and the bracket bar 36 are collapsed, handle 26 may then be collapsed and detents 31 will again lock the equipment in its travelling position.

It is believed that it will be clearly apparent from the above description and the disclosure in the drawings, that the invention comprehends a novel construction of a collapsible golf-bag cart.

Having thus described my invention, I claim:

1. A golf-bag cart, comprising: a main frame adapted to support a golf bag; a bracket bar pivotably secured to said main frame; a bracket strut pivotably secured to said bracket bar; said bracket bar and said bracket strut being adapted to form a rigid triangular bracket when the cart is in use; wheel outriggers, having down-turned ends, supported by said bracket in either an extended position of use or in a folded position; wheels mounted for rotation on the down-turned ends of said wheel outriggers; said bracket bar forming housing means for said outriggers when in the folded position adapted to position said wheels with their axis of rotation substantially aligned with the longitudinal axis of said main frame.

2. A golf-bag cart, comprising: a main frame adapted to support a golf-bag; a bracket bar pivotably secured to said main frame; a bracket strut pivotably secured to said bracket bar; said bracket bar and said bracket strut being adapted to form a rigid triangular bracket when the cart is in use; wheel outriggers, having down-turned ends, supported by said bracket in either an extended position of use or in a folded position; said wheel outriggers having guiding and positioning means on their inner ends; wheels mounted for rotation on the down-turned ends of said wheel outriggers; said bracket bar forming housing means for said outriggers when in the folded position adapted to position said wheels with their axis of rotation substantially aligned with the longitudinal axis of said main frame.

3. A golf-bag cart, comprising: a main frame adapted to support a golf-bag; a bracket bar pivotably secured to said main frame; a bracket strut pivotably secured to said bracket bar; said bracket bar and said bracket strut being adapted to form a rigid triangular bracket when the cart is in use, wheel outriggers, having down-turned ends, supported by said bracket in either an extended position of use or in a folded position; said wheel outriggers having guiding and positioning means on their inner ends; wheels mounted for rotation on the down-turned ends of said wheel outriggers; spaced apart guide bars fixedly secured to said bracket bar adapted to co-act with said positioning means to guide and position said wheel outriggers; said bracket bar forming housing means for said outriggers when in the folded position adapted to position said wheels with their axis of rotation substantially aligned with the longitudinal axis of said main frame.

4. A golf-bag cart, comprising: a main frame, adapted to support a golf-bag; a bracket bar pivotally secured to said main frame; a bracket strut pivotally secured to said bracket bar; said bracket bar and said bracket strut being adapted to form a rigid triangular bracket when the cart is in use, wheel outriggers, having down-turned ends, supported by said bracket in either an extended position of use or in a folded position; one of said wheel outriggers having guiding and positioning means on its inner end; wheels mounted for rotation on the downturned ends of said wheel outriggers; spaced apart guide bars fixedly secured to said bracket bar adapted to co-act with said positioning means to guide and position said wheel outriggers; spring urged locking members pivotally supported by said guide bars and adapted to lock said wheel outriggers in their operative position; said bracket bar forming housing means for said outriggers when in the folded position adapted to position said wheels with their axis of rotation substantially aligned with the longitudinal axis of said main frame.

5. A cart, comprising: a main frame, a bracket bar hingedly coupled to said main frame and lying therealong, means for maintaining said bar angularly disposed relative said main frame, a pair of L-shaped outriggers each having an arm and an angularly disposed leg, said outriggers being arranged with their arms juxtaposed relative each other and relative said bracket bar for sliding movement therealong in the cart's folded position, the leg portions of said outriggers being transversely disposed relative said main frame in the cart's extended position and each having a wheel revolubly mounted thereon; means permitting said outrigger arms, when extended relative said bar, to be pivoted so that the arms are lateral thereof; and means for retaining said outrigger arms in said lateral arrangement.

6. A cart, comprising: a main frame, a pair of L-shaped outriggers each having an arm and an angularly disposed leg, said outriggers being arranged with their arms juxtaposed relative each other and relative said frame for sliding movement therealong in their folded position, the leg portions of said outriggers being transversely disposed relative said main frame in their extended position and each having a wheel pivotally mounted thereon; means permitting said outrigger arms, when extended relative said frame, to be pivoted so that the arms are lateral thereof; means for retaining said outrigger arms in said lateral arrangement and a handle pivoted to said main frame having a detent adapted to engage said outrigger, when in its folded position and prevent longitudinal movement of the same.

7. A cart, comprising: an upright main frame, a collapsible bracket carried by said frame, an opposed pair of L-shaped outriggers cantilevered transversely of said bracket and each having a wheel on the outer end, said outriggers being pivotally coupled to said bracket, and latch means for retaining said outriggers from pivotal movement, said pivotal connection between said bracket and said outriggers being separable whereby the arms of said outriggers may be brought into overlapping relation with said bracket.

8. A cart, comprising: a main frame; a bar hingedly coupled to said main frame and lying therealong; a pair of L-shaped brackets having their arms arranged in juxtaposition with each other and with said bar, said bracket arms being slidably associated with said bar, the leg portions of said brackets being transversely disposed relative said main frame; each leg portion having a wheel pivotally mounted thereon; means permitting said brackets when extended relative said bar to be pivoted so that the arms are lateral thereof; and means for retaining said bracket arms in the lateral arrangement.

9. A collapsible golf-bag cart, comprising: a main frame of U-shaped cross-section; means for securing a golf-bag within said U-shaped frame; wheel outriggers of rectangular cross-section having downturned ends; wheel supporting studs secured in said down-turned ends; wheels operatively supported on said studs; a collapsible bracket bar hingedly secured to said main frame and adapted to operatively support said wheel outriggers; a bracket strut hingedly secured to said bracket bar and adapted to operatively engage said main frame and thus operatively support said wheel outriggers; and a handle of channel section hingedly secured to said main frame and adapted to form a securing cover for said bracket bar and said bracket strut when they are in their folded position.

THOMAS A. HUTSELL.

REFERENCES CITED

The following references are of record in the file of this patent:

UNITED STATES PATENTS

| Number | Name | Date |
|---|---|---|
| 1,462,133 | Glock | July 17, 1923 |